Figure 1:
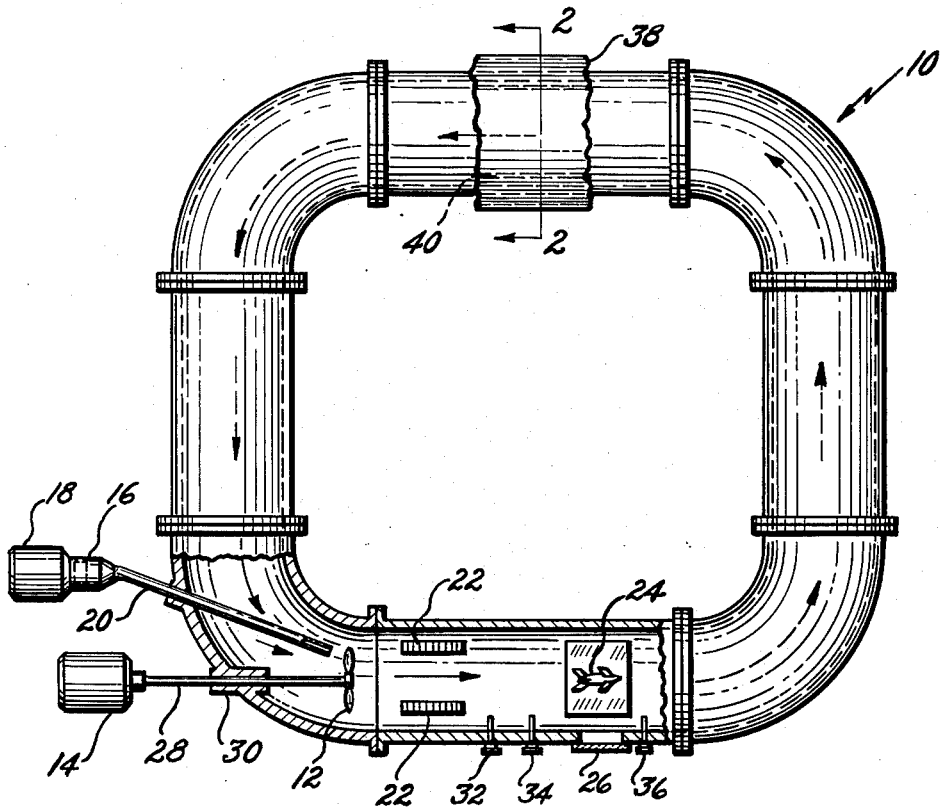

July 18, 1961  E. W. BOSSE  2,992,557
VARIABLE HIGH DENSITY AND HIGH TEMPERATURE WIND TUNNEL
Filed July 9, 1957

INVENTOR.
EARL W. BOSSE
BY
ATTORNEYS

United States Patent Office 2,992,557
Patented July 18, 1961

2,992,557
VARIABLE HIGH DENSITY AND HIGH TEMPERATURE WIND TUNNEL
Earl W. Bosse, 6801 Timberling Drive, Dayton, Ohio
Filed July 9, 1957, Ser. No. 670,839
2 Claims. (Cl. 73—147)
(Granted under Title 35, U.S. Code (1952), sec. 266)

The invention described herein may be manufactured and used by or for the United States Government for governmental purposes without payment to me of any royalty thereon.

This invention relates to wind tunnels and more particularly to improvements in wind tunnels capable of producing high density, high temperature and high velocity air conditions suitable for testing components subject to such conditions in use, for example, the parts of a turbojet engine located in hot sections of an engine.

To create these conditions, the presently used methods require a large initial investment and high operating costs. A conventional tunnel employs a compressor which utilizes air at atmospheric pressure, raises it to the desired density and velocity, after which it is heated by burning hydrocarbon fuel in the tunnel and the compressed and heated air passed over the test specimen and then exhausted to the atmosphere. This "one pass" system wastes all the compression and heat energy which has been generated when it is exhausted to the atmosphere and the burning of the fuel generates haze or smoke from the unconsumed carbon particles which makes viewing the test specimen when under test, difficult, if not impossible.

The cost of building a test tunnel of conventional design capable of raising the pressure to 20 atmospheres (300 p.s.i.) and the temperature to 1900° F., is relatively high, whereas a tunnel incorporating the features to be described and capable of generating the same conditions would cost only a small fraction thereof. In addition to the low construction cost, the cost of the tunnel incorporating the improvements described herein would also be very substantially reduced.

An object of this invention is to reduce the high cost of building and operating high compression, high temperature, high velocity wind tunnels, to simplify the operation of such tunnels and to make it possible to conveniently study specimens while under test.

By combining the well known closed loop tunnel used in high velocity wind tunnels with a small external compressor to supply the internal pressure and make-up air with an axial flow compressor whose blades are cooled by the air forced in by the external compressor and an electric heating element, the desired pressure, velocity and heat can be conveniently generated, easily controlled at a small operating cost, and at an initial cost for the tunnel and controls of a fraction of the cost of conventional tunnels.

Figure 2:
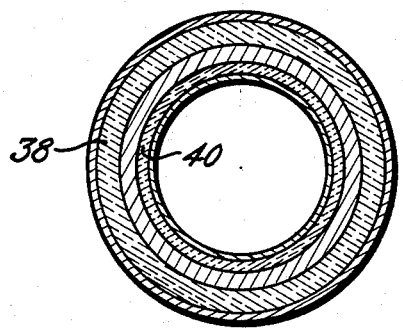

With the above and other objects and features in view, the invention will now be described with particular reference to the accompanying drawings which illustrate a preferred embodiment thereof and in which:

FIGURE 1 is a plan view showing a preferred embodiment of this invention; and
FIGURE 2 is a cross sectional view of the tunnel.

In the drawing a closed loop or tube 10 of stainless steel insulated inside and out, made in sections for easy assembly and capable of withstanding an internal pressure of 300 pounds per square inch, or any other pressure desired is provided. An axial flow compressor 12 located within the tube 10 and having a shaft 28 leading outside the tunnel to a compressor motor 14 is provided adjacent to one end of the loop. An auxiliary compressor 16 of commercial design with its motor 18 compresses and furnishes make-up air from the atmosphere to the tunnel through duct 20 and which is directed against the blades of the compressor 12 to cool them at the same time that it keeps the pressure in the tunnel or tube 10 up to the required density. Suitable electric heating elements 22 are provided and the air passes over these elements 22 after it has discharged from the compressor 12. A test specimen 24 is mounted on a suitable support below a conventional viewing window 26 of quartz glass or some suitable material. The shaft 28 connecting the compressor motor 14 to the axial flow compressor 12 passes through a conventional labyrinth seal 30.

In order to prevent excessive loss of heat from the tunnel suitable outside and inside insulation, 38 and 40, is provided as shown most clearly in FIG. 2.

In operation the test specimen 24 is placed in position and the tube 10 closed. The external or auxiliary compressor 16 is started and the air in tunnel 10 brought up to the desired density by observing the dial of a suitable pressure gage 32 and regulating the speed of the motor with any conventional speed control. The compressor 12 is then started and the air in the tunnel brought up to the desired velocity as indicated on a wind gage 34, and the heating elements 22 are turned on to bring the temperature up to the desired point as will be indicated on a temperature indicator 36.

The desired density, velocity and temperature of the air is maintained by observing the gages 32, 34 and 36 and regulating the speed of motors 18, 14 and the amount of current supplied to heating elements 22 by conventional means and the specimen 24 is viewed through window 26.

From the foregoing description of this invention and its operation it is obvious that it has many advantages over the present wind tunnels of conventional design. The cost of construction is only a fraction of the cost of the conventional tunnel and the cost of operation is likewise reduced. Instead of wasting the heated and compressed air it is passed over the specimen again and again thus preventing the excessive loss of heat and pressure as is the case with the conventional system. It is also more convenient to operate and maintenance of the desired density and temperature is easy and sure while observation of the specimen undergoing the test is facilitated due to the absence of haze or smoke which accompanies the combustion of hydrocarbon fuels as is the case with the conventional tunnel.

What I claim as new is:

1. In combination, a closed loop wind tunnel, a source of power located outside of said tunnel, an axial flow compressor located within said tunnel and arranged to compress and to increase the velocity of the air therein, a shaft extending through a wall of said tunnel and connecting said source of power and said axial flow compressor, means for sealing the opening in said wall through which said shaft projects to prevent leakage of air around said shaft, an auxiliary compressor located without said tunnel and arranged to deliver compressed air close to said axial flow compressor at substantially ambient temperatures, said compressed air being effective to cool said axial flow compressor and bring the air in said tunnel to the desired density, electric heating means located adjacent to the exhaust end of said axial flow compressor for heating the high density high-velocity air therefrom, and means on the inner and outer surfaces of said tunnel for preventing escape of heat therefrom.

2. In combination, a closed loop wind tunnel, a source of power located outside said tunnel, means located within said tunnel for compressing and increasing the velocity of a stream of air, a shaft extending through a wall of said tunnel and connecting said source of power to said compressing and velocity means, means for sealing the opening in said wall through which said shaft extends to prevent leakage of air around said shaft, auxiliary means located without said tunnel for delivering compressed air at substantially ambient temperatures to said first-mentioned compressing means, said compressed air being effective to cool the said compressing and velocity means and bring the air in said tunnel to the desired density, electric heating means located beyond said first-mentioned compressor to heat the high-density high-velocity air to high temperatures, means for supporting a device to be tested in the center of said wind tunnel, a transparent window located in the wall of said tunnel to permit inspection of said device, and means for heat insulating said tunnel to prevent escape of heat therefrom.

References Cited in the file of this patent

UNITED STATES PATENTS

| | | |
|---|---|---|
| 2,152,317 | Kramer | Mar. 28, 1939 |
| 2,448,966 | Fales | Sept. 7, 1948 |
| 2,702,157 | Stalker | Feb. 15, 1955 |
| 2,748,599 | Keller | June 5, 1956 |

FOREIGN PATENTS

| | | |
|---|---|---|
| 482,902 | Germany | Sept. 24, 1929 |